(12) United States Patent
Sato et al.

(10) Patent No.: US 8,402,713 B2
(45) Date of Patent: Mar. 26, 2013

(54) FOUNDATION FOR BUILDING IN NUCLEAR FACILITIES AND METHOD FOR BUILDING FOUNDATION

(75) Inventors: Kunihiko Sato, Tokyo (JP); Hiroshi Shimizu, Tokyo (JP); Takeo Baba, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/383,770

(22) PCT Filed: Oct. 19, 2010

(86) PCT No.: PCT/JP2010/068402
§ 371 (c)(1),
(2), (4) Date: Jan. 12, 2012

(87) PCT Pub. No.: WO2011/052435
PCT Pub. Date: May 5, 2011

(65) Prior Publication Data
US 2012/0110937 A1    May 10, 2012

(30) Foreign Application Priority Data
Oct. 30, 2009    (JP) .................................. 2009-251163

(51) Int. Cl.
*E04B 1/00*    (2006.01)
*E02D 27/32*    (2006.01)
(52) U.S. Cl. ...................................... 52/742.14; 52/294
(58) Field of Classification Search ................... 52/294, 52/742.14
See application file for complete search history.

(56) References Cited

U.S. PATENT DOCUMENTS
3,599,589 A * 8/1971 Busey ........................... 114/264

FOREIGN PATENT DOCUMENTS
| JP | 42-11013 Y1 | 6/1967 |
| JP | 7-41494 A | 7/1995 |
| JP | 7-294682 A | 11/1995 |
| JP | 2504360 B2 | 6/1996 |
| JP | 9-80183 A | 3/1997 |
| JP | 2000-265479 A | 9/2000 |
| JP | 2004-316100 A | 11/2004 |
| JP | 2010-181227 A | 8/2010 |

OTHER PUBLICATIONS

International Search Report of PCT/JP2010/068402, date of mailing Nov. 16, 2010.
Written Opinion of PCT/JP2010/068402, date of mailing Nov. 16, 2010.

* cited by examiner

*Primary Examiner* — Mark Wendell
(74) *Attorney, Agent, or Firm* — Westerman, Hattori, Daniels & Adrian, LLP (57) ABSTRACT

To include a lower foundation 30 provided on a ground 7 and an upper foundation 31 provided above the lower foundation 30 with a base isolating device 32 interposed therebetween. The upper foundation 31 includes a bottomed steel-plate form 40, a hull structure 41 arranged in the steel plate form 40, and a concrete part 46 filled in the steel plate form 40. The hull structure 41 is constituted in a lattice shape by a plurality of transverse reinforcing ribs 42 that extend on a bottom steel plate 40a of the steel plate form 40 and a plurality of longitudinal reinforcing ribs 43 that extend on the bottom steel plate 40a of the steel plate form 40 so as to be orthogonal to the transverse reinforcing ribs 42.

6 Claims, 6 Drawing Sheets

FOUNDATION FOR BUILDING IN NUCLEAR FACILITIES AND METHOD FOR BUILDING FOUNDATION

FIELD

The present invention relates to a foundation for a building in nuclear facilities serving as a base for a building in nuclear facilities such as a reactor containment vessel and to a method for building a foundation.

BACKGROUND

Conventionally, as a foundation related to the present invention, a foundation structure of a structure that includes a lower foundation built on the ground and an upper foundation built above the lower foundation with a base isolating device interposed therebetween has been known (for example, see Patent Literature 1). In this foundation structure, the upper foundation is built by casting concrete in a steel plate form that is constituted by a bottom steel plate and a side steel plate. In this foundation structure of a structure, because assembling and disassembling operations as in a concrete form can be omitted, a significant reduction in power at the time of on-site construction and a significant reduction in the construction period can be achieved.

CITATION LIST

Patent Literature

Patent Literature 1: Japanese Patent Application Laid-open No. 2000-265479

SUMMARY

Technical Problem

According to such a conventional foundation structure, in the upper foundation, upper end reinforcements (reinforcing steels) are arranged within the steel plate form so that a predetermined strength is obtained and then concrete is cast in the form. However, the arrangement of the upper end reinforcements within the steel plate form is a complicated operation and thus requires many hands. Consequently, a further reduction in the construction period is difficult and the foundation structure becomes complicated. Particularly, when the conventional foundation structure is used for a foundation of a building in nuclear facilities, because the foundation of a building in nuclear facilities is large, complicated building operations such as assembling of reinforcing steels may extend the construction period of nuclear facilities.

Therefore, an object of the present invention is to provide a foundation for a building in nuclear facilities and a method for building a foundation that can reduce the construction period and can provide a simple structure while a predetermined strength is ensured.

Solution to Problem

According to an aspect of the present invention, a foundation for a building in nuclear facilities includes: a lower foundation provided on a ground; and an upper foundation provided above the lower foundation with a base isolating device interposed therebetween. The upper foundation includes a bottomed steel-plate form, a hull structure arranged in the steel plate form, and a concrete part filled in the steel plate form.

According to this configuration, because a simple hull structure can be provided in the steel plate form, the upper foundation can be constituted without upper end reinforcements and lower end reinforcements. Accordingly, a complicated operation of arranging reinforcing steels is not required at the time of building the upper foundation, and thus the construction period can be reduced.

Advantageously, in the foundation for a building in nuclear facilities, the hull structure includes at least one of a transverse reinforcing rib that extends on a bottom of the steel plate form and a longitudinal reinforcing rib that extends on a bottom of the steel plate form so as to be orthogonal to the transverse reinforcing rib.

According to this configuration, the hull structure can be constituted by at least one of the transverse reinforcing rib and the longitudinal reinforcing rib, and thus the upper foundation can be constructed strongly.

In this case, the steel plate form is preferably constituted by combining a plurality of partial steel-plate forms.

Advantageously, in the foundation for a building in nuclear facilities, the steel plate form is constituted by combining a plurality of partial steel-plate forms. Accordingly, even when the steel plate form is large, it can be appropriately installed by combining the plurality of partial steel-plate forms.

Advantageously, in the foundation for a building in nuclear facilities, the upper foundation includes a fitting groove formed along a base end part of the building in nuclear facilities to be installed, and the upper foundation is constituted by fitting the base end part of the building into the fitting groove.

According to this configuration, the upper foundation can be integrated with the base end part of a building in nuclear facilities, and thus the nuclear facilities can be constructed strongly.

Advantageously, in the foundation for a building in nuclear facilities, the building in nuclear facilities is arranged on the upper foundation, and the building is a reactor containment vessel that is constituted by a wall with a hull structure.

According to this configuration, because the reactor containment vessel has a hull structure, the reactor containment vessel can be constructed strongly. In addition, at the time of building the foundation and the reactor containment vessel, building methods and components to be used can be standardized.

According to another aspect of the present invention, a method for building a foundation of a building in nuclear facilities, which includes a lower foundation and an upper foundation provided above the lower foundation with a base isolating device interposed therebetween, and which serves as a base for a building in nuclear facilities, includes: a scaffold installing step of installing a scaffold on the lower foundation having been built; a steel-plate-form installing step of installing a bottomed steel-plate form in which a hull structure is provided on the scaffold having been installed; and a concrete filling step of filling concrete in the steel plate form.

According to this configuration, any operation of arranging reinforcing steels that is a complicated building operation is not required, and thus the construction period can be reduced. In addition, because a simple hull structure is provided in the steel plate form, a strong upper foundation can be built.

Advantageously, in the method for building a foundation of a building in nuclear facilities further includes: step of forming a fitting groove along a base end part of the building in the hull structure provided in the steel plate form, and a building fitting step of fitting a base end part of the building into the fitting groove after the steel-plate-form installing process.

According to this configuration, the upper foundation can be integrated with the base end part of a building in nuclear facilities, and thus the nuclear facilities can be constructed strongly.

Advantageous Effects of Invention

According to the foundation for a building in nuclear facilities and the method for building a foundation of the present invention, a simple hull structure can be provided in a steel plate form, and thus upper end reinforcements and lower end reinforcements can be eliminated and a strong structure can be provided. Therefore, the construction period can be reduced while a predetermined strength is ensured.

DESCRIPTION OF EMBODIMENTS

Exemplary embodiments of a foundation for a building in nuclear facilities and a method for building a foundation according to the present invention will be explained below in detail with reference to the accompanying drawings. The present invention is not limited to the embodiments. In addition, constituent elements in the embodiments include those that can be easily replaceable by persons skilled in the art, or that are substantially equivalent.

Embodiment

A foundation according to an embodiment of the present invention serves as a base for a building in nuclear facilities and includes a base isolating device. While examples of the building in nuclear facilities include a reactor containment vessel and a nuclear-fuel reprocessing facility, a case of applying a reactor containment vessel to a building in nuclear facilities is explained below. Before explaining the foundation, a nuclear facility is explained.

Figure 1:
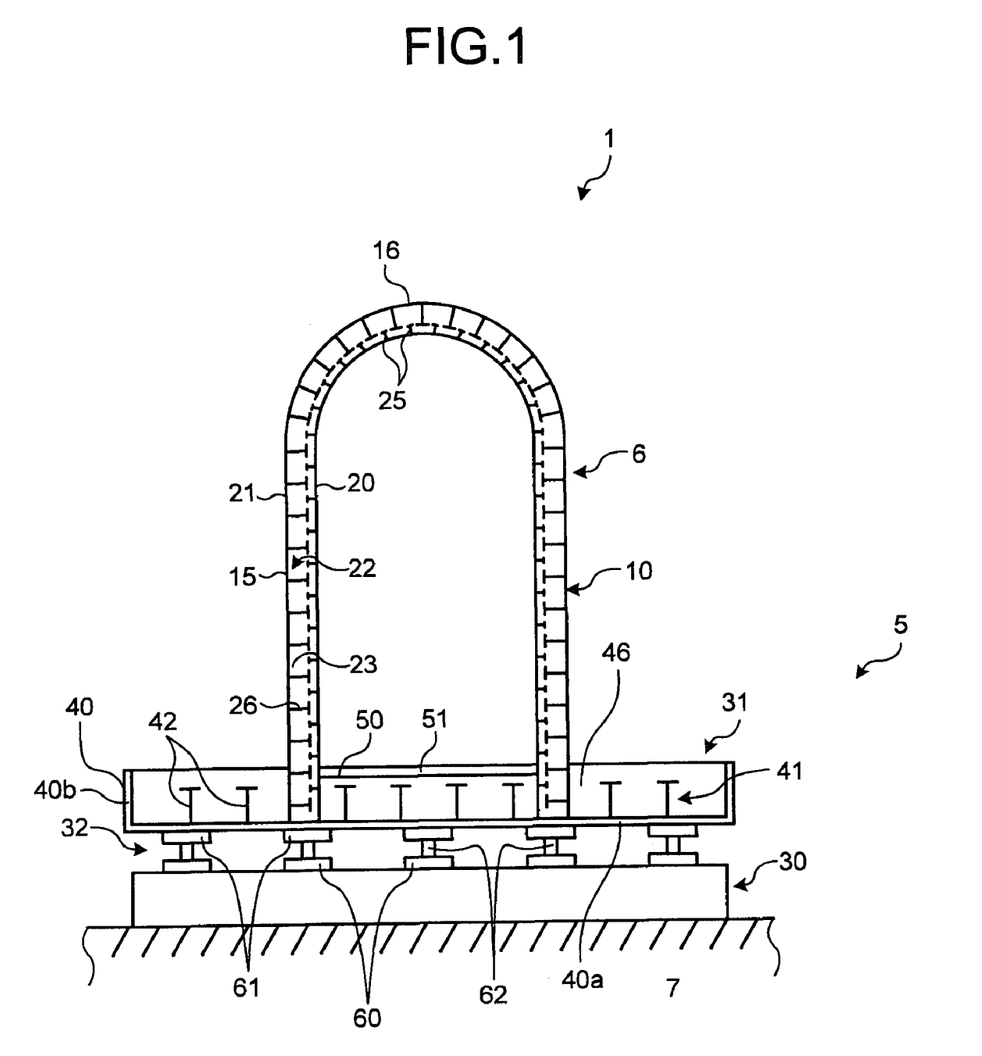
FIG. 1 is a cross-sectional schematic diagram of a nuclear facility to which a foundation according to an embodiment of the present invention is applied.

As shown in FIG. 1, a nuclear facility 1 is constituted by a foundation 5 on a ground 7 and a reactor containment vessel 6 on the foundation 5. A reactor can be contained within the reactor containment vessel 6, and for example, a pressurized water reactor is used as the reactor.

The reactor containment vessel 6 is constituted by a wall 10 having a hull structure 22, and is integrally constituted by a cylindrical part 15 installed on the foundation 5 and a dome part 16 arranged on the cylindrical part 15. The cylindrical part 15 is formed in a cylindrical shape so as to be straight from a side of the foundation 5 toward a side of the dome part 16, and the dome part 16 is formed in a hollow semi-spherical shape.

The wall 10 of the reactor containment vessel 6 is explained next with reference to FIGS. 1 and 2. The wall 10 of the reactor containment vessel 6, that is, the wall 10 of the cylindrical part 15 and the dome part 16 includes a liner plate 20 serving as an inner wall surface, an outer steel plate 21 serving as an outer wall surface, the hull structure 22 provided on an inner wall side of the outer steel plate 21, and a concrete part 23 cast between the liner plate 20 and the outer steel plate 21.

The liner plate 20 is formed of a steel plate and maintains the reactor containment vessel 6 airtight. A plurality of liner anchors 25 are arranged in a matrix shape on an outer wall side of the liner plate 20. Accordingly, the liner anchors 25 can fix the liner plate 20 appropriately to the concrete part 23 without the liner plate 20 being peeled from the concrete part 23.

The outer steel plate 21 is also formed of a steel plate like the liner plate 20, and the hull structure 22 is provided on the inner wall side of the outer steel plate 21 by welding. The hull structure 22 is constituted in a lattice shape by a plurality of horizontal reinforcing ribs 26 arranged so as to extend in a horizontal direction (see FIG. 1) and a plurality of vertical reinforcing ribs 27 arranged so as to extend in a vertical direction (see FIG. 3). Each of the horizontal reinforcing ribs 26 and each of the vertical reinforcing ribs 27 are made of T-shaped steel whose cross-section is formed in a T-shape.

The concrete part 23 is formed by filling concrete between the liner plate 20 and the outer steel plate 21.

The foundation 5 arranged on the ground 7 is explained next with reference to FIGS. 1 to 3. For example, the foundation 5 is as large as 80 to 120 meters in length in transverse and longitudinal directions, and is constituted such that the reactor containment vessel 6 described above can be installed. The foundation 5 is constituted by a lower foundation 30 arranged on the ground 7, an upper foundation 31 arranged upward of the lower foundation 30 in a vertical direction with a space interposed therebetween, and a base isolating device 32 interposed between the lower foundation 30 and the upper foundation 31.

The lower foundation 30 has a reinforced concrete structure (an RC structure) obtained by arranging lower end reinforcements and upper end reinforcements in a concrete form and then filling concrete in the concrete form, and is formed in a cuboid shape.

The upper foundation 31 has a steel concrete structure (an SC structure) obtained by filling concrete in a steel plate form 40, and is formed in a cuboid shape. Specifically, the upper foundation 31 is constituted by the steel plate form 40 formed of a steel plate, a hull structure 41 provided in the steel plate form 40, and a concrete part 46 filled in the steel plate form 40.

The steel plate form 40 is constituted in a bottomed box shape by a square-shaped bottom steel plate 40a and a side steel plate 40b provided at four sides of the bottom steel plate 40a.

Figure 3:
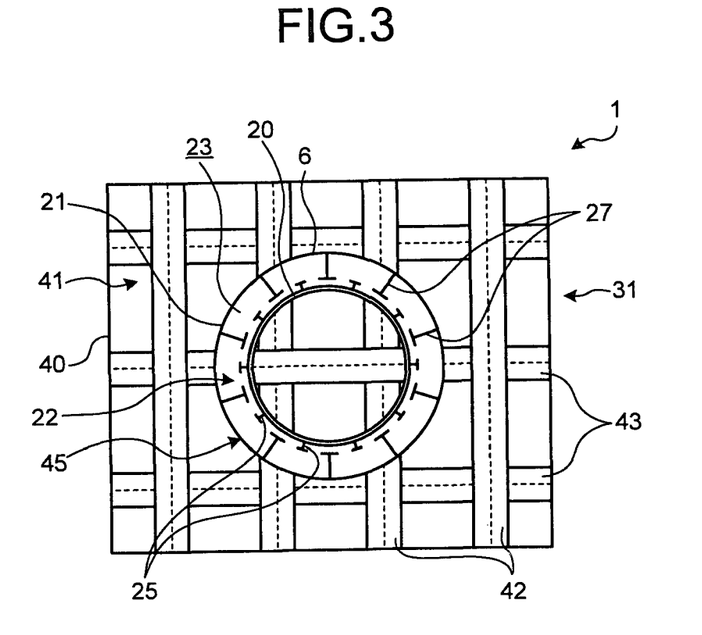
FIG. 3 is a top schematic diagram of an upper foundation.

As shown in FIG. 3, the hull structure 41 is constituted in a lattice shape by a plurality of transverse reinforcing ribs 42 that extend on the bottom steel plate 40a of the steel plate form 40 and a plurality of longitudinal reinforcing ribs 43 that extend on the bottom steel plate 40a of the steel plate form 40 so as to be orthogonal to the transverse reinforcing ribs 42. Each of the transverse reinforcing ribs 42 and each of the longitudinal reinforcing ribs 43 are made of T-shaped steel whose cross-section is formed in a T-shape (see FIG. 5).

In this case, the hull structure 41 is provided with a fitting groove 45 into which a base end part of the reactor containment vessel 6 installed on the upper foundation 31 can fit. Specifically, the fitting groove 45 is formed in a ring-shape so as to cut off the respective transverse reinforcing ribs 42 and the respective longitudinal reinforcing ribs 43 of the hull structure 41 along a cylindrical shape of the base end part of the reactor containment vessel 6.

Figure 2:
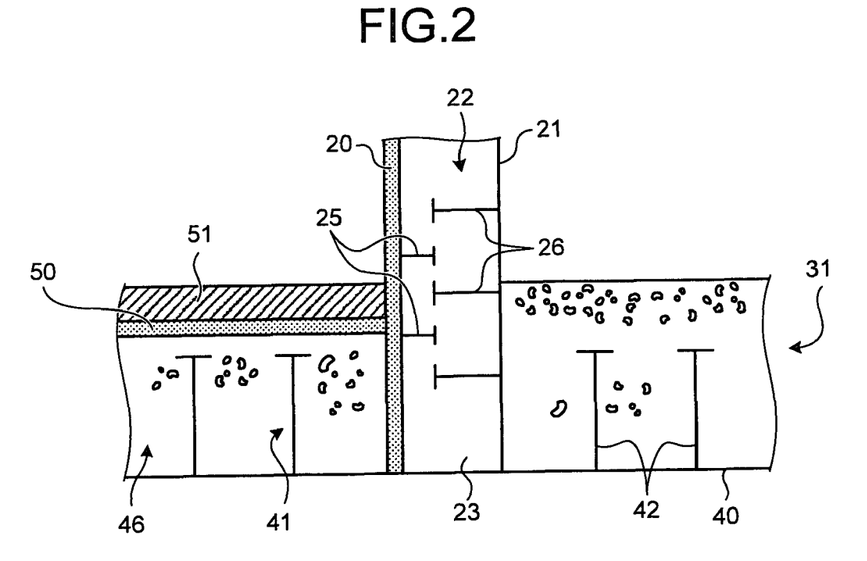
FIG. 2 is a partial cross-sectional schematic diagram of the nuclear facility to which the foundation according to the present embodiment is applied.

As shown in FIG. 2, the base end part of the reactor containment vessel 6 fitted into the fitting groove 45 of the hull structure 41, that is, a base end part of the liner plate 20 and a base end part of the outer steel plate 21 abut against the bottom steel plate 40a of the steel plate form 40, and these abutting parts are joined to the bottom steel plate 40a by welding.

The concrete part 46 is formed by filling concrete in the steel plate form 40. At this time, as shown in FIG. 2, the height of the concrete part 46 within the reactor containment vessel 6 is lower than that of the concrete part 46 outside the reactor containment vessel 6. A bottom liner plate 50 is arranged on a top surface of the concrete part 46 within the reactor containment vessel 6, and the bottom liner plate 50 is joined to the liner plate 20 of the reactor containment vessel 6 by welding. Accordingly, the inside of the reactor containment vessel 6 is covered by the liner plate 20 and the bottom liner plate 50, and thus the reactor containment vessel 6 is maintained airtight. Furthermore, a grout 51 serving as a floor surface within the reactor containment vessel 6 is provided on the bottom liner plate 50 by casting concrete. The height of the grout 51 is substantially the same as that of the concrete part 46 outside the reactor containment vessel 6.

The base isolating device 32 has a known configuration, and is constituted by a lower projection 60 provided on a top surface of the lower foundation 30, an upper projection 61 provided on a bottom surface of the upper foundation 31, and a base isolating part 62 provided between the lower projection 60 and the upper projection 61. The lower projection 60 is made of cylindrical concrete and is formed by casting concrete on the lower foundation 30. The upper projection 61 is formed of columnar steel and is joined to a bottom surface of the steel plate form 40 by welding. The base isolating part 62 has a multi-layered structure obtained by stacking a disc-shaped rubber material and a disc-shaped steel plate alternately, and one end of the base isolating part 62 is fixed to a top surface of the lower projection 60 and the other end thereof is fixed to a bottom surface of the upper projection 61.

Therefore, in the foundation 5, the upper foundation 31 is arranged above the lower foundation 30 with the base isolating device 32 interposed therebetween. Accordingly, when the ground 7 vibrates by an earthquake or the like, vibrations from the lower foundation 30 can be suppressed by the base isolating device 32, and thus vibrations of the upper foundation 31 are suppressed.

Next, a series of operating processes for building the foundation 5 described above is specifically explained with reference to FIGS. 4 to 7. A method for building the foundation 5 includes a lower-foundation building process, a scaffold installing process, a steel-plate-form installing process, a containment-vessel fitting process, a concrete filling process, a bottom-liner arranging process, a grout arranging process, a base-isolating-device arranging process, and a scaffold removing process.

Figure 4:
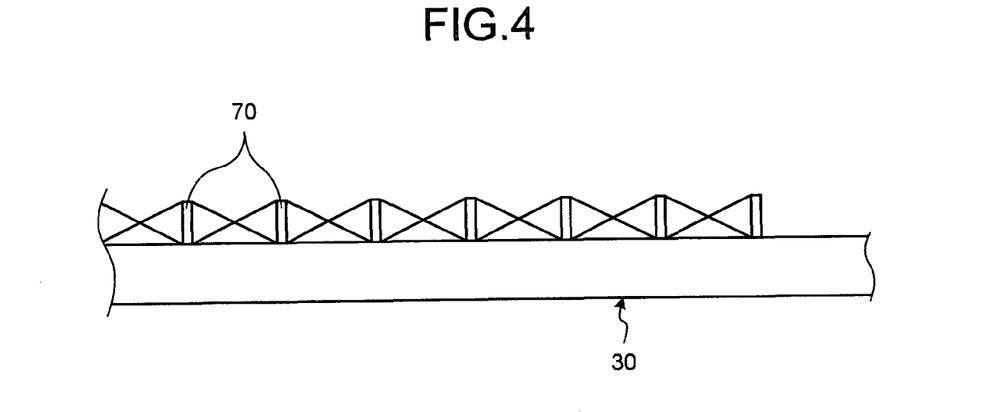
FIG. 4 is an explanatory diagram of a scaffold installing process in a method for building a foundation according to the present embodiment.

Although not shown in the drawings, in the lower-foundation building process, a concrete form is installed on the ground 7, upper end reinforcements and lower end reinforcements are arranged within the form, and then concrete is filled in the form, thereby building the lower foundation 30 on the ground 7. As shown in FIG. 4, in the scaffold installing process, a plurality of scaffolds 70 are installed on the lower foundation 30 that has been built.

Figure 5:
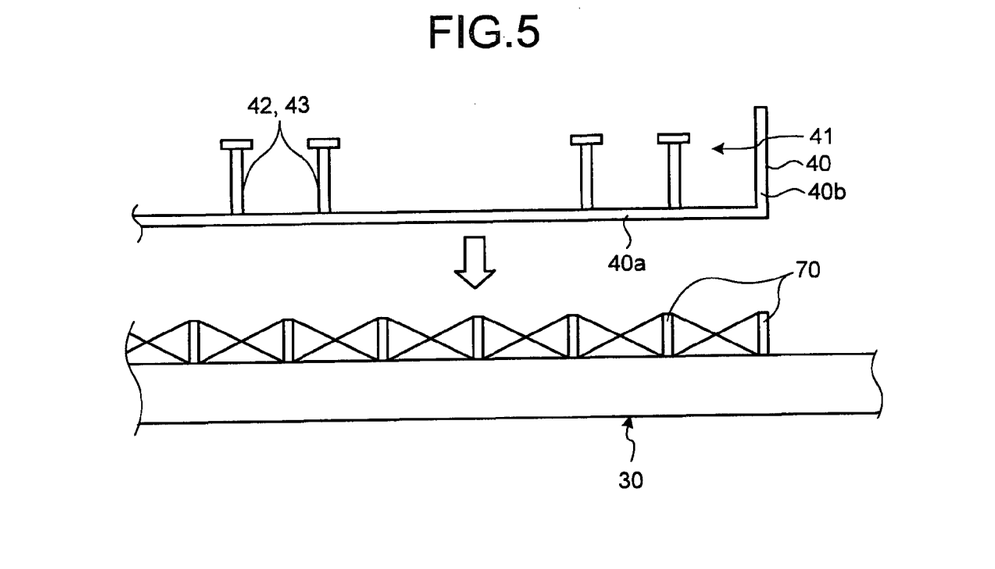
FIG. 5 is an explanatory diagram of a steel-plate-form installing process in the method for building a foundation according to the present embodiment.
Figure 9:
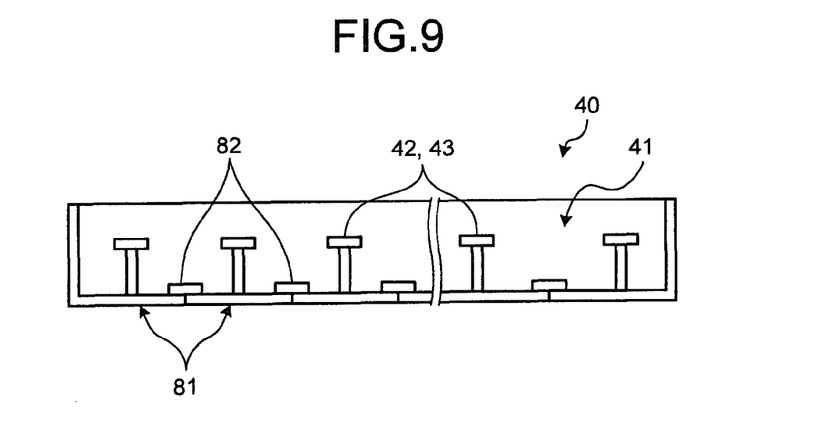
FIG. 9 is a schematic diagram of a steel plate form constituted by a plurality of divided steel plate forms.

As shown in FIG. 5, in the steel-plate-form installing process, the steel plate form 40 in which the hull structure 41 is provided is installed on the scaffolds 70. Because the foundation 5 of the reactor containment vessel 6 is large as explained above, as shown in FIG. 9, the steel plate form 40 can be divided into a plurality of divided steel-plate forms 81 and the divided forms can be delivered and installed. Thereafter, the divided steel-plate forms 81 are connected to each other using a bonding material 82 by welding, thereby constructing the steel plate form 40. In this case, the plurality of transverse reinforcing ribs 42 and the plurality of longitudinal reinforcing ribs 43 in the hull structure 41 are preferably installed in the joined steel plate form 40 and provided therein by welding. At this time, to form the ring-shaped fitting groove 45 in the hull structure 41, the respective transverse reinforcing ribs 42 and the respective longitudinal reinforcing ribs 43 are provided so as to be away from the base end part of the reactor containment vessel 6 to be installed.

Figure 6:
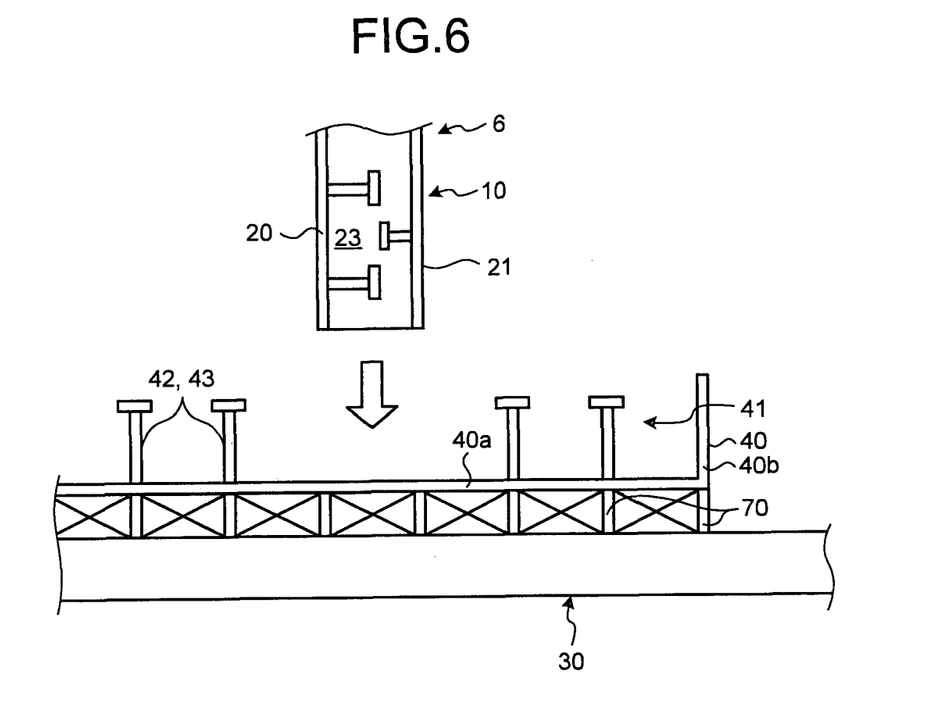
FIG. 6 is an explanatory diagram of a containment-vessel fitting process in the method for building a foundation according to the present embodiment.

As shown in FIG. 6, in the containment-vessel fitting process, the base end part of the reactor containment vessel 6 is fitted into the fitting groove 45 formed in the hull structure 41, the bottom steel plate 40a of the steel plate form 40 is made to abut against the base end part of the reactor containment vessel 6, and then the abutting parts are connected to each other by welding.

Figure 7:
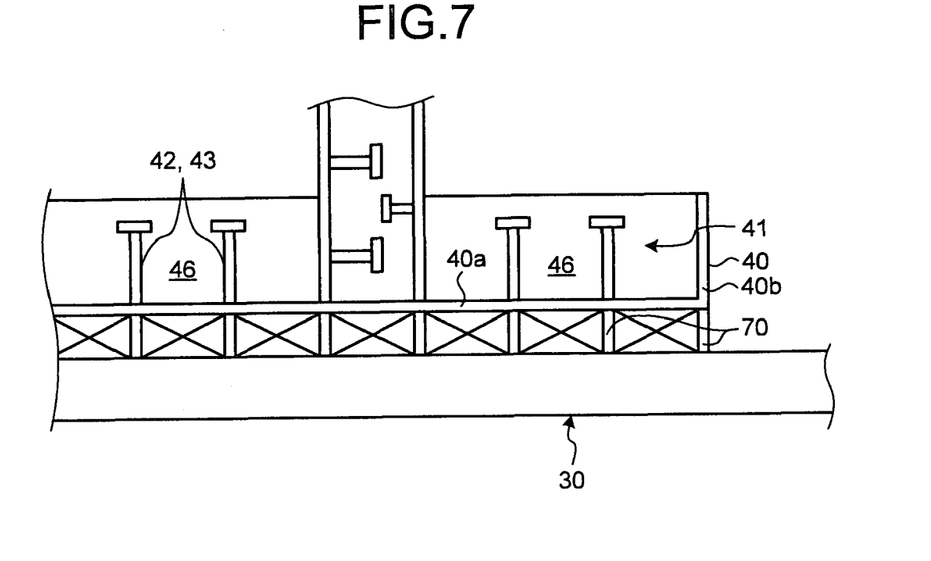
FIG. 7 is an explanatory diagram of a concrete filling process in the method for building a foundation according to the present embodiment.

As shown in FIG. 7, in the concrete filling process, concrete is filled in the steel plate form 40. At this time, concrete is filled such that the height of concrete filled in the reactor containment vessel 6 is lower than that of concrete filled outside the reactor containment vessel 6.

Although not shown in the drawings, in the bottom-liner arranging process, after concrete filled in the reactor containment vessel 6 is hardened, the bottom liner plate 50 is arranged on the top surface of the hardened concrete part 46 within the reactor containment vessel 6, and the liner plate 20 of the reactor containment vessel 6 is joined to the bottom liner plate 50 by welding. In the grout arranging process, concrete is cast on the arranged bottom liner plate 50, so that the grout 51 serving as a floor is formed.

In the base-isolating-device arranging process, after the steel plate form 40 is installed, the lower projection 60 is arranged on the top surface of the lower foundation 30 and the upper projection 61 is arranged on the bottom surface of the steel plate form 40. Thereafter, the base isolating part 62 is arranged between the lower projection 60 and the upper projection 61. In the scaffold removing process, the scaffolds 70 installed on the lower foundation 30 are removed after the base isolating device 32 is arranged and concrete filled in the steel plate form 40 is hardened.

According to the above configuration, the hull structure 41 with a simple configuration can be provided in the steel plate form 40. Therefore, the upper foundation 31 can be constituted by eliminating upper end reinforcements and lower end reinforcements. Consequently, any operation of arranging reinforcing steels that is a complicated building operation is not required at the time of building the upper foundation 31, and thus the construction period can be reduced.

Because the hull structure 41 is constituted in a lattice shape by the plurality of transverse reinforcing ribs 42 and the plurality of longitudinal reinforcing ribs 43, the upper foundation 31 can be constructed strongly.

Furthermore, because the base end part of the reactor containment vessel 6 can be fitted into the upper foundation 31, the upper foundation 31 can be integrated with the reactor containment vessel 6 and thus the nuclear facility 1 can be constructed strongly.

Further, the hull structure 22 is provided in the reactor containment vessel 6 and the hull structure 41 is provided in the upper foundation 31. Therefore, building methods and components can be standardized, and thus the cost required for building the nuclear facility 1 can be reduced.

Figure 10:
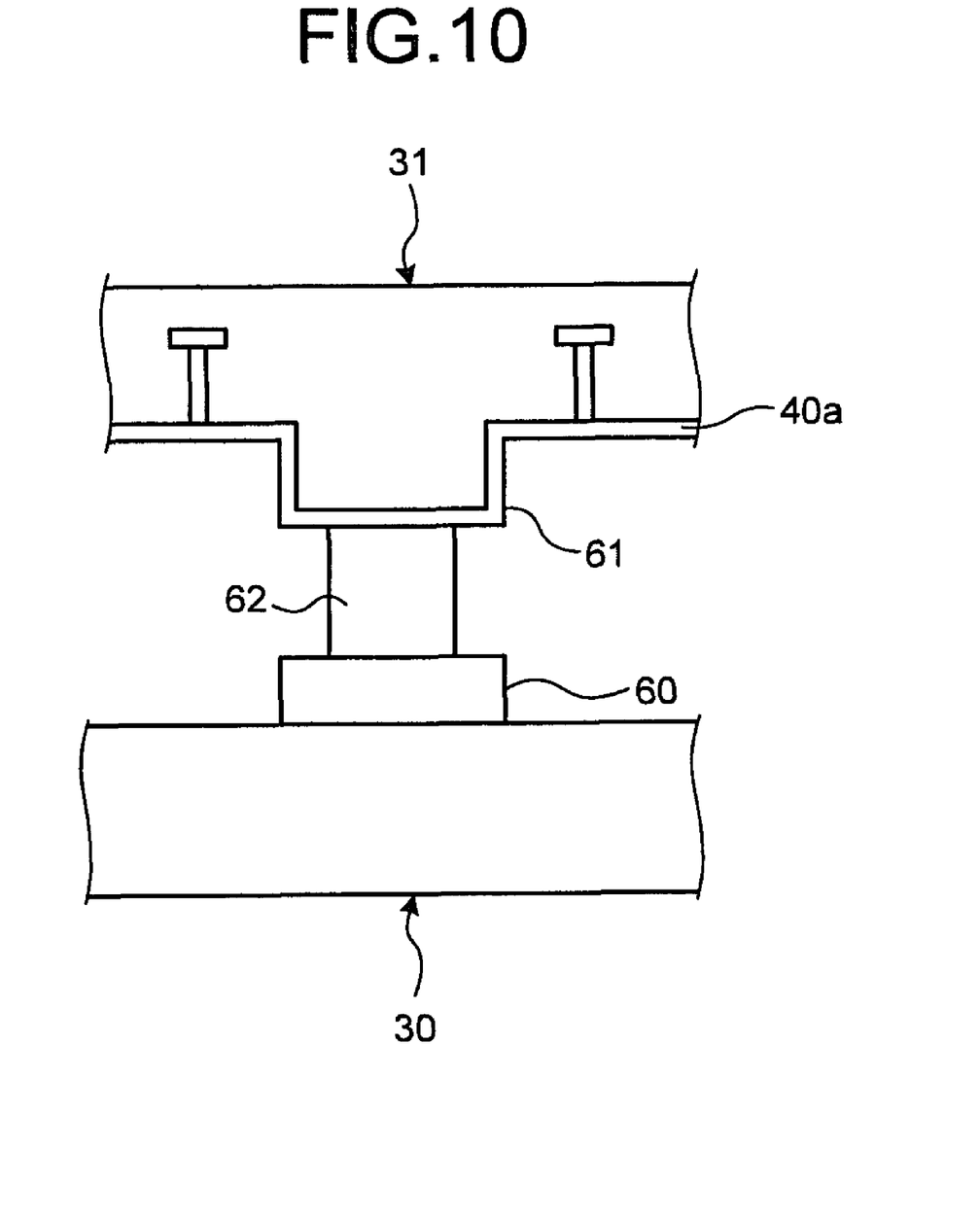
FIG. 10 is a schematic diagram around a base isolating device.

While the upper projection 61 of the base isolating device 32 is arranged on the bottom steel plate 40a in the present embodiment, the present invention is not limited thereto. As shown in FIG. 10, by forming a projection that protrudes downward at the bottom steel plate 40a, a structure corresponding to the upper projection 61 of the base isolating device 32 can be formed. Furthermore, the base isolating device 32 can be constituted such that the upper projection 61 is eliminated and the base isolating part 62 is arranged between the bottom steel plate 40a and the lower projection 60.

Further, while the wall 10 of the reactor containment vessel 6 has a hull structure in the present embodiment, the present invention is not limited thereto, and a reactor containment vessel having a reinforced concrete structure (an RC structure) constituted by reinforcing steel and concrete can be also used.

Figure 8:
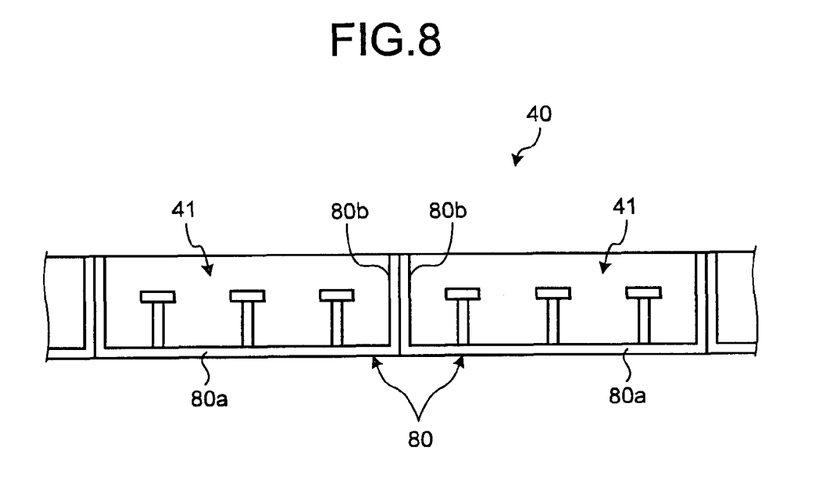
FIG. 8 is a schematic diagram of a steel plate form constituted by a plurality of partial steel plate forms.

The foundation 5 of the reactor containment vessel 6 is large as explained above. Accordingly, as shown in FIG. 8, for example, the steel plate form 40 can be constituted by a plurality of partial steel-plate forms 80 and these partial steel-plate forms 80 can be joined to each other. In this case, each of the partial steel-plate forms 80 is formed in a bottomed box shape by a bottom steel plate 80a and a side steel plate 80b provided at four sides of the bottom steel plate 80a, and the hull structure 41 is provided in the partial steel-plate form 80. When the steel plate form 40 is installed in the steel-plate-form installing process, the plurality of partial steel-plate forms 80 are delivered and installed and then these installed partial steel-plate forms 80 are joined by welding, thereby constructing the steel plate form 40.

INDUSTRIAL APPLICABILITY

As described above, the foundation for a building in nuclear facilities and the method for building a foundation according to the present invention are useful for a foundation that serves as a base for a reactor containment vessel, and are particularly suitable for making the configuration of an upper foundation simple.

REFERENCE SIGNS LIST 1 nuclear facility
5 foundation
6 reactor containment vessel
7 ground
10 wall
15 cylindrical part
16 dome part
20 liner plate
21 outer steel plate
22 hull structure of reactor containment vessel
23 concrete part of reactor containment vessel
25 liner anchor
26 horizontal reinforcing rib
27 vertical reinforcing rib
30 lower foundation
31 upper foundation
32 base isolating device
40 steel plate form
40a bottom steel plate
40b side steel plate
41 hull structure of upper foundation
42 transverse reinforcing rib
43 longitudinal reinforcing rib
45 fitting groove
46 concrete part of upper foundation
50 bottom liner plate
51 grout
60 lower projection
61 upper projection
62 base isolating part
70 scaffold
80 partial steel-plate form
80a bottom steel plate of partial steel-plate form
80b side steel plate of partial steel-plate form
81 divided steel-plate form
82 bonding material

The invention claimed is:

1. A foundation for a building in nuclear facilities, comprising:
   a lower foundation provided on a ground; and
   an upper foundation provided above the lower foundation with a base isolating device interposed therebetween, wherein
   the upper foundation includes a bottomed steel-plate form, a hull structure arranged in the steel-plate form, and a concrete part filled in the steel-plate form,
   the hull structure includes a transverse reinforcing rib that extends on a portion of a bottom of the steel-plate form parallel to the ground and a longitudinal reinforcing rib that extends on the portion of the bottom of the steel-plate form parallel to the ground so as to be orthogonal to the transverse reinforcing rib, and
   the transverse reinforcing rib and the longitudinal reinforcing rib are made of a T-shaped steel whose cross-section is formed in a T-shape,
   wherein a section of the transverse reinforcing rib extending from said bottom, which forms a top surface of the T-shape of said T-shaped steel, is parallel to said portion, and
   a section of the longitudinal reinforcing rib extending from said bottom, which forms a top surface of the T-shape of said T-shaped steel, is parallel to said portion, and
   wherein the hull structure is constituted in a lattice shape by a plurality of longitudinal reinforcing ribs arranged so as to extend in a horizontal direction and a plurality of transverse reinforcing ribs arranged so as to extend in a vertical direction.

2. The foundation for a building in nuclear facilities according to claim 1, wherein the steel-plate form is constituted by combining a plurality of partial steel-plate forms.

3. The foundation for a building in nuclear facilities according to claim 1, wherein
   the upper foundation includes a fitting groove formed along a base end part of the building in nuclear facilities to be installed, and the upper foundation is constituted by fitting the base end part of the building into the fitting groove.

4. The foundation for a building in nuclear facilities according to claim 1, wherein the building in nuclear facilities is arranged on the upper foundation, and the building is a reactor containment vessel that is constituted by a wall with a hull structure.

5. A method for building a foundation of a building in nuclear facilities according to claim 1, comprising:

a scaffold installing step of installing a scaffold on the lower foundation having been built;

a steel-plate form installing step of installing a bottomed steel-plate form in which a hull structure is provided on the scaffold having been installed; and a concrete filling step of filling concrete in the steel-plate form.

6. The method for building a foundation of a building in nuclear facilities according to claim 5, further comprising:

step of forming a fitting groove along a base end part of the building in the hull structure provided in the steel-plate form, and a building fitting step of fitting a base end part of the building into the fitting groove after the steel-plate form installing process.

\* \* \* \* \*